Figure 1:
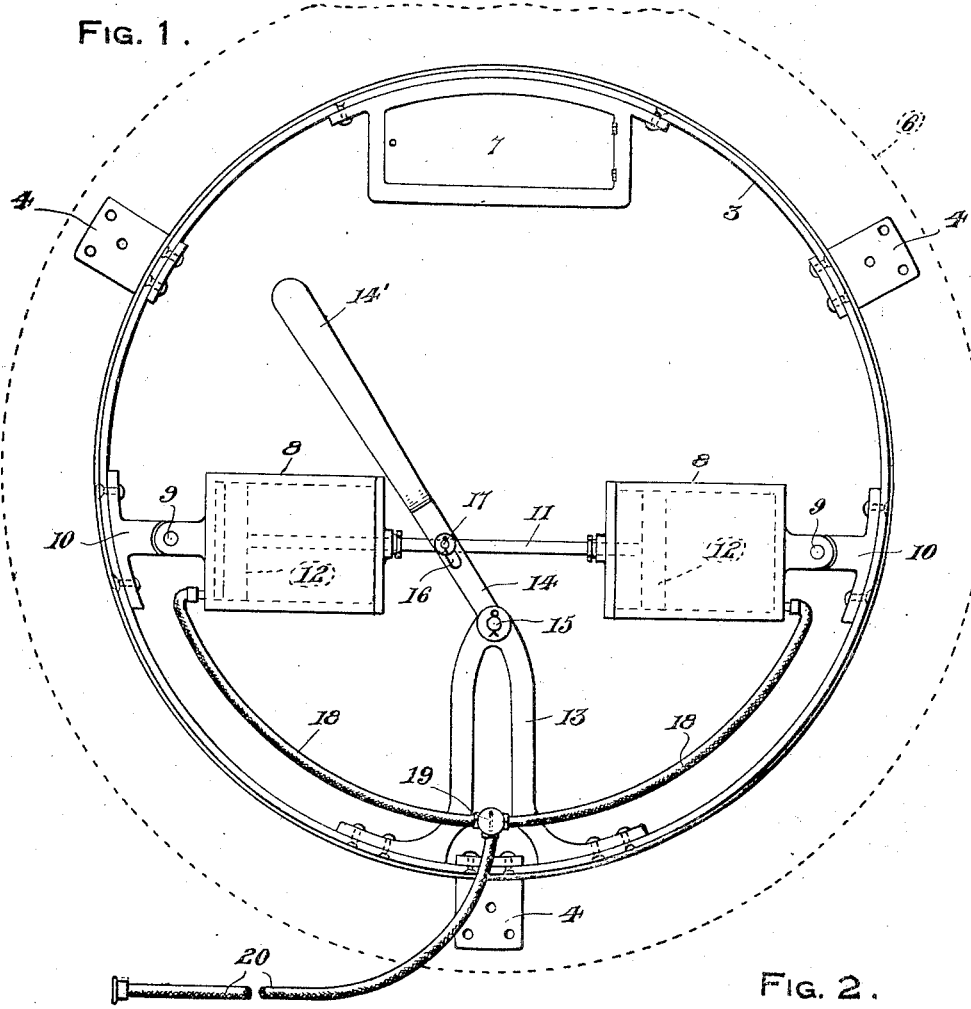

P. WAJDIĆ.
TIRE PUMP.
APPLICATION FILED JAN. 19, 1920.

1,346,284.

Patented July 13, 1920.

Inventor
P. Wajdić

By A. M. Wilson
Attorney

UNITED STATES PATENT OFFICE.

PETAR WAJDIĆ, OF PLEASANT UNITY, PENNSYLVANIA.

TIRE-PUMP.

1,346,284.  Specification of Letters Patent.  Patented July 13, 1920.

Application filed January 19, 1920. Serial No. 352,328.

*To all whom it may concern:*

Be it known that I, PETAR WAJDIĆ, a citizen of Jugo-Slavia, residing at Pleasant Unity, in the county of Westmoreland and State of Pennsylvania, have invented certain new and useful Improvements in Tire-Pumps, of which the following is a specification.

The present invention has particular reference to a tire pump with a supporting member therefor, the support for the pump being the spare tire carrier mounted upon the body of the automobile.

A further object of the invention is to mount a tire pump within the space inside of a spare tire carrier on an automobile whereby a convenient support for a tire pump is afforded.

With the above general objects in view and others that will become apparent as the nature of the invention is better understood, the same consists in the novel combination and arrangement of parts hereinafter fully described in the accompanying drawing in which like reference characters designate corresponding parts throughout the several views.

Figure 2:
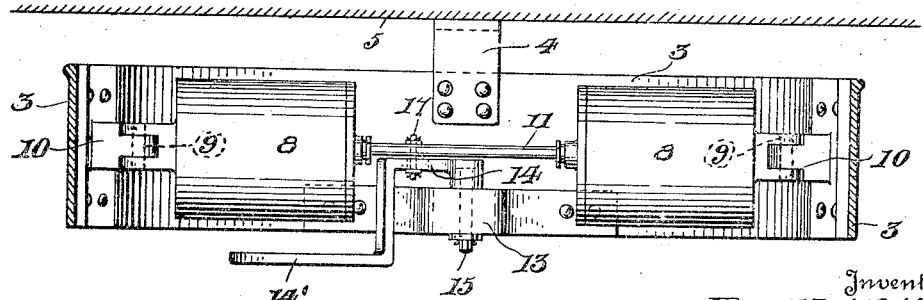

In the drawing,

Figure 1 is a front elevational view of a tire pump constructed in accordance with the present invention, the same being supported within the spare tire carrier of an automobile, and Fig. 2 is a horizontal sectional view taken through the spare tire carrier.

Briefly described, the present invention aims to provide a pump especially designed for the inflation of automobile tires with a convenient mounting for the pump, whereby the pump will be in position at all times for use. The spare tire carrier is employed as a mounting support for the pump, the pump being permanently located within the central space of the tire carrier, while a tool and tube receptacle is fixed to the tire carrier to contain such articles when not in use.

Referring more in detail to the accompanying drawing, there is illustrated a spare tire carrier 3 carrying brackets 4 by which the carrier 3 is secured to the body 5 of an automobile or other convenient support, a tire 6 being shown by dotted lines in Fig. 1 as mounted on the carrier 3. As shown in Fig. 1, a receptacle 7 having an upper wall curved coincident to the curvature of the carrier 3 is secured to said carrier to depend within the central space of the carrier, and is adapted for containing tools, pump hose or the like when the pump is out of use.

The pump proper is of the double acting type and includes opposed cylinders 8 having extreme pivotal connections 9 with brackets 10 secured to the inner face of the tire carrier 3, the pump cylinders 8 being maintained in alinement by the central piston rod 11 carrying a piston head 12 upon each end thereof operating in the opposed cylinders. In order to effect a reciprocation of the pistons 12 within the cylinders 8, there is provided a support 13 secured to the lower central portion of the tire carrier 3 with the lever 14 pivotally mounted as at 15 to the upper end of the support 13 and having a longitudinal slot 16 therein receiving a pin 17 projecting from the piston rod 11 while the upper end of the lever 14 is offset as at 14' as clearly shown in Fig. 2 to project outwardly of the outer edge of the outer carrier 3 to insure an unobstructed swinging movement of said lever. The outer lower edge of each pump cylinder 8 has a hose connection 18 with the valve casing 19 while a single outlet hose 20 is connected to said valve for the delivery of the compressed air to the desired point.

When the pump is not in use, the hose connections 18 may be removed from the pump cylinders 8 and together with the outlet section 20 and valve casing 19 be placed in the receptacle 7. When it is desired to use the pump, the hose sections 18 are secured to the pump cylinders in an obvious manner and by swinging the lever 14 by means of the offset handle portion 14' upon its pivotal connection 15, the piston rod 11 will simultaneously move the pistons 12 in the cylinders 8 in opposite directions to effect a constant passage of air through the single outlet hose 20 for the purpose of inflating tires, or for any use desired.

While there is herein shown and described the preferred embodiment of the invention, it is nevertheless to be understood that minor changes may be made therein without departing from the spirit and scope of the invention as claimed.

What I claim as new is:—

A pump of the type described comprising an annular supporting member, pump cylinders pivotally mounted at their ends on said supporting member in opposed relations, a piston in each cylinder, a single piston rod connecting the pistons, a bracket secured to the annular supporting member at a point beneath the piston rod, a handle pivotally mounted at its lower end in the upper end of said bracket and a pin and slot connection between the piston rod and handle, and a laterally offset portion carried by the handle and positioned outwardly of the annular supporting member.

In testimony whereof I affix my signature.

PETAR WAJDIĆ.